United States Patent [19]
Honda et al.

[11] Patent Number: 5,387,857
[45] Date of Patent: Feb. 7, 1995

[54] BATTERY CHARGING APPARAUTS

[75] Inventors: Satoshi Honda; Masayuki Toriyama; Hiroyuki Suzuki; Yoshihiro Nakazawa, all of Saitama, Japan

[73] Assignee: Honda Giken Kogyo Kabushiki Kaisha, Tokyo, Japan

[21] Appl. No.: 832,352

[22] Filed: Feb. 7, 1992

[30] Foreign Application Priority Data

Feb. 8, 1991 [JP] Japan .................................. 3-037681
Apr. 9, 1991 [JP] Japan .................................. 3-103325

[51] Int. Cl.6 .............................................. H02J 7/00
[52] U.S. Cl. ........................................ 320/18; 320/17
[58] Field of Search .................................... 320/17, 18

[56]         References Cited
          U.S. PATENT DOCUMENTS

| | | | |
|---|---|---|---|
| 3,237,078 | 2/1966 | Mallory | 320/17 |
| 3,280,397 | 10/1966 | Bruns | 318/139 |
| 3,305,754 | 2/1967 | Oaks et al. | 320/37 |
| 3,440,514 | 4/1969 | Fenley | 320/6 |
| 3,928,791 | 12/1975 | Mullersman | 320/7 |
| 4,079,303 | 3/1978 | Cox | 320/17 |
| 4,238,721 | 12/1980 | DeLuca et al. | 320/18 |
| 4,303,877 | 12/1981 | Meinhold | 320/6 |
| 4,616,170 | 10/1986 | Urstöger | 320/5 |
| 4,670,703 | 6/1987 | Williams | 320/22 |
| 4,782,279 | 11/1988 | Selanger | 320/46 |
| 5,063,340 | 11/1991 | Kalenowsky | 320/1 |

OTHER PUBLICATIONS

"Design Ideas" by K. C. Herrick, 2119 EDN Magazine, vol. 26(1981) Feb. No. 3, Boston Mass., USA, pp. 164 & 166.

Primary Examiner—Thomas M. Dougherty

[57]         ABSTRACT

A battery charging apparatus for charging a battery which includes a plurality of battery cells connected to each other in series. The battery charging apparatus supplies an electric charge to the battery which is controlled by monitoring the terminal voltage of each of the battery cells. In the alternative, the battery cells may be divided into battery-cell groups. Each group consists of two or more of the battery cells. The electric charge supplied to the battery is controlled by monitoring the terminal voltage of each of the battery-cell groups. The supply of electric charge is terminated upon monitoring a predetermined voltage in the battery cells.

20 Claims, 12 Drawing Sheets

BATTERY CHARGING APPARATUS

BACKGROUND OF THE INVENTION

1. Field of the Invention

The present invention relates to a battery charging apparatus, and in particular, to a battery charging apparatus for charging a battery comprising a plurality of battery cells connected to each other in series.

2. Description of Background Art

In recent years, vehicles powered by batteries have been developed. Requirements for a battery mounted in a vehicle for supplying power include small size, light weight and large capacity. In many cases, a set battery is used in order to satisfy these requirements. A set battery comprises a plurality of cell batteries which are connected to each other in series.

Such a set battery is charged by applying a voltage across the terminals of each battery cell in the series connection as will be described by referring to FIGS. 7-12. The voltage of the battery cells connected in series to each other is determined by the number of connected cells.

In general, electric charge is contained even if the battery has been fully charged, the excess energy is not accumulated in the electrodes but, instead, consumed in an electrolysis of the electrolyte which may inadvertently generate reaction gas or dissipate excessive heat. This phenomenon has an undesirable effect on the life of the set battery. In order to solve this problem, it is necessary to continuously monitor the battery during electric charging and discontinue the charging as soon as the battery achieves a fully charged state.

As shown in FIG. 7, a set battery 50 is configured to comprise a plurality of battery cells 50-1 to 50-n. A main power supply 53 is operatively connected to a variable constant-current control circuit 51 with electric power for charging the set battery 50. The variable constant-current control 51 controls the electric power supplied thereto, providing the set battery 50 with a predetermined charging current ICH.

An overvoltage detecting circuit 52 monitors the series voltage VBA of the set battery 50 in order to protect the set battery 50 against an overvoltage. As shown in FIG. 8(a), the overvoltage detecting circuit 52 supplies an overvoltage detecting signal S1 to the variable constant-current control circuit 51 when the series voltage VBA reaches an overvoltage level VTH. Upon receiving the overvoltage detection signal S1, the variable constant-current control circuit 51 either cuts off the charging current ICH as shown in FIG. 8(b), or switches to trickle charging, providing the set battery 50 with current having an amount close to the self-discharging current of the set battery 50.

FIG. 9 is a diagram showing how to charge a set battery 60 which is configured to comprise a plurality of lead battery cells 60-1 to 60-n. The same reference numerals and notations as those shown in FIG. 7 are used to denote the same components/elements or their equivalents.

In this arrangement, an intermittent control circuit 61 is employed for controlling the variable constant-current control circuit 51 by monitoring the series voltage VBA of the set battery 60. Intermittent charging is thereby repeated as denoted by reference numerals 1-4 of FIG. 10.

As shown in FIG. 10, line segment 1 denotes a state in which the variable constant-current control circuit 51 supplies a constant current until the series voltage VBA reaches a predetermined value V2. Line segment 2 is a state in which a charging current is output to sustain the series voltage VBA at the upper limit V2 thereafter. Line segment 3 denotes a subsequent state in which the charging current is reduced linearly until the series voltage VBA decreases from the upper limit V2 to a lower limit V1. Line segment 4 denotes a state in which the charging current is again increased in order to sustain the series voltage VBA at the lower limit V1.

In this intermittent charging, as the time cycle of the state 4 exceeds a predetermined period of time, the set battery is judged to have been fully charged and the electric charging is terminated accordingly.

FIG. 11 is a diagram showing how to charge a set battery 70 which is configured to comprise a plurality of Ni/Cd battery cells 70-1 to 70-n. The same reference numerals and notations as those shown in FIG. 9 are used to denote the same components/elements or their equivalents.

A peak-value detecting circuit 71 monitors the series voltage VBA of the set battery 70 in order to protect the set battery 70 against an overvoltage. As shown in FIG. 12(a), the peak-voltage detecting circuit 71 supplies a peak-value detection signal S2 to the variable constant-current control circuit 51 when the series voltage VBA reaches a peak value VP. Receiving the overvoltage detection signal S2, the variable constant-current control circuit 51 either cuts off the charging current ICH as shown in FIG. 12(b), or switches to trickle charging, providing the set battery 70 with current having an amount close to the self discharging current of the set battery 70.

As described above, the conventional charging of a set battery is accomplished by monitoring the series voltage VBA of the set battery. The electric charging is continued until the series voltage VBA reaches a level indicating that the set battery has been fully charged.

In the conventional technique described above, the series voltage VBA is used as a parameter for determining whether or not the set battery has entered a fully charged state. However, the battery cells constituting the set battery have capacities which are different from each other. Accordingly, the electric charging may be continued only because a battery cell has not been fully charged even if another battery cell has been fully charged. In such a case, the fully charged battery cell will be excessively charged, giving rise to a problem of a shortened life of the set battery.

In addition, in the conventional techniques, temperatures of the battery cells are not taken into consideration when determining the timing to start electric charging and the setting of the quantity of charging current. Accordingly, current may be charged excessively, exceeding an appropriate amount. The excessive charging current increases the amount of oxygen generated in the battery cell, lowering the electric-charging efficiency. As a result, the internal pressure increases, undesirably shortening the life of the set battery.

SUMMARY OF THE INVENTION

It is an object of the present invention to solve the problem encountered in the conventional technique as described above by providing a battery charging apparatus which is capable of charging a set battery without going into an overcharged state.

In order to achieve the object described above, the present invention provides a battery charging apparatus for charging a set battery with a configuration comprising a plurality of battery cells connected to each other in series, wherein charging current supplied to the set battery is controlled by monitoring the terminal voltage of each battery cell. In addition, the charging current supplied to the set battery may also be controlled by monitoring the temperature of each battery cell.

In such a scheme, charge current supplied individually to each of the battery cells or cell groups constituting the set battery can be controlled in accordance with a criterion as to whether the particular battery cell is or is not fully charged. Accordingly, the battery charging apparatus provided by the invention is capable of protecting particular battery cells against over charging which causes the set battery to be damaged or to deteriorate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described with reference to the drawings as follows.

Figure 1:
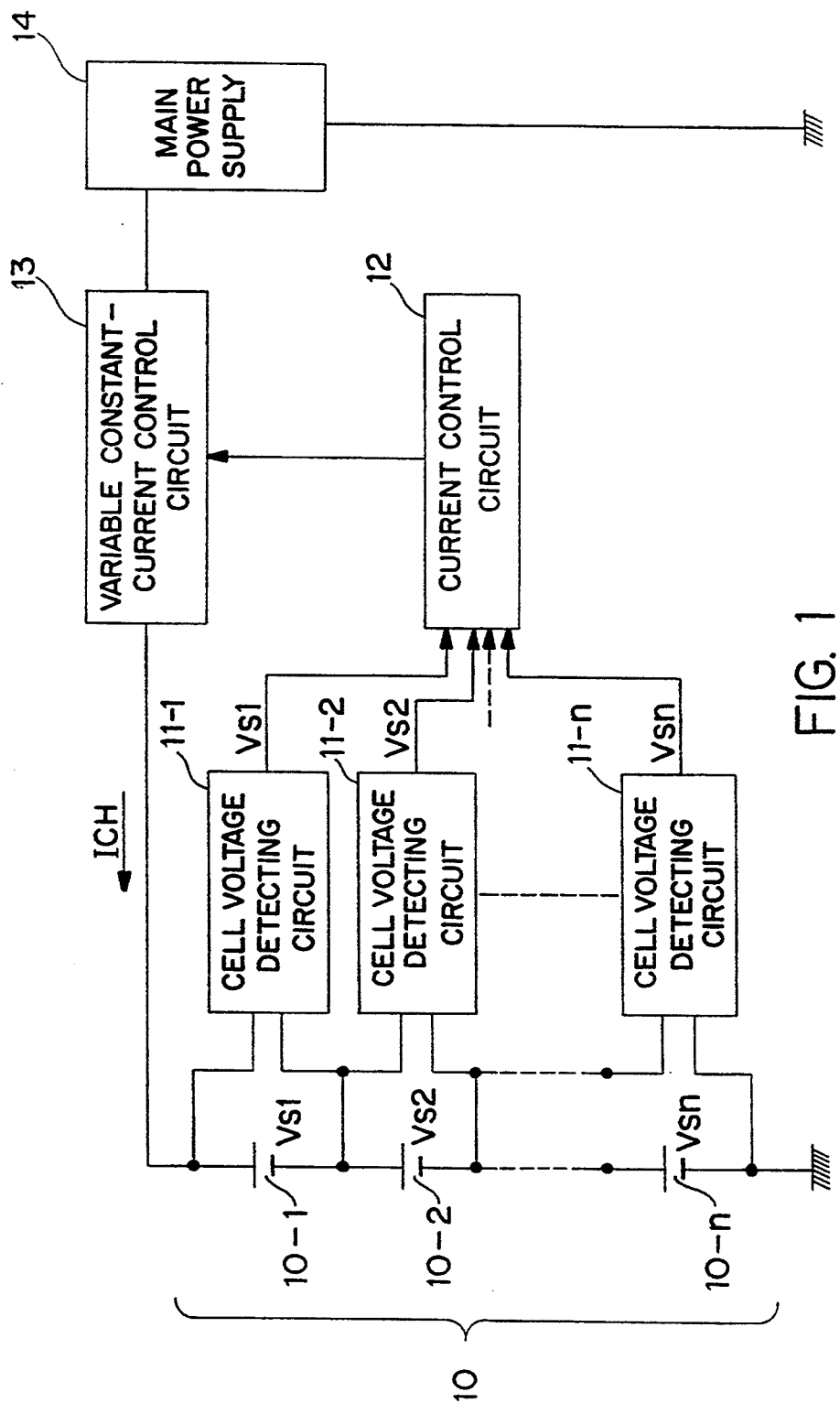
FIG. 1 is a block diagram of a first embodiment implementing a battery charging apparatus in accordance with the present invention.

FIG. 1 is a block diagram of an embodiment implementing a battery charging apparatus in accordance with the present invention.

As shown in the figure, each of cell-voltage detecting circuits 11-1 to 11-n is connected to one of battery cells 10-1 to 10-n which form a set battery 10. Each of the cell-voltage detecting circuits 11-1 to 11-n is used for monitoring the terminal voltage of a battery cell to which the cell-voltage detecting circuit is connected. The terminal voltage Vsl to Vsn monitored by the cell-voltage detecting circuit 11-1 to 11-n are all input to a current control circuit 12.

The current control circuit 12 determines an optimum charging current ICH based on the detected terminal voltage Vsl to Vsn output by the cell-voltage detecting circuits 11-1 to 11-n. A variable constant-current control circuit 13 outputs the charging current ICH determined by the current control circuit 12 by regulating power provided by a main power supply 14.

In such a configuration, when at least one of the battery cells 10-1 to 10-n is fully charged, the terminal voltage Vsx thereof, which is referred to hereafter as the cell voltage, increases to a certain level, causing the current control circuit 12 to issue a command to the variable constant-current control circuit 13 to stop the electric charging. Receiving the command to discontinue the electric charging, the variable constant-current control circuit 13 stops supplying current to the set battery 10.

In this embodiment, when at least one of the battery cells 10-1 to 10-n which constitute the set battery 10 is fully charged, the electric charging is halted. Accordingly, no battery cells deteriorate or are damaged due to overcharging.

It has been explained that as a fully charged state is detected, the variable constant-current control circuit 13 discontinues the electric charging. It should be noted, however, that the present invention is not limited to such a scheme. Instead, trickle charging can also be carried out as well after a fully charged state has been detected.

The trickle charging allows current to be charged into other battery cells that have not been fully charged without damaging the battery cell that has already been fully charged due to overcharging.

Figure 2:
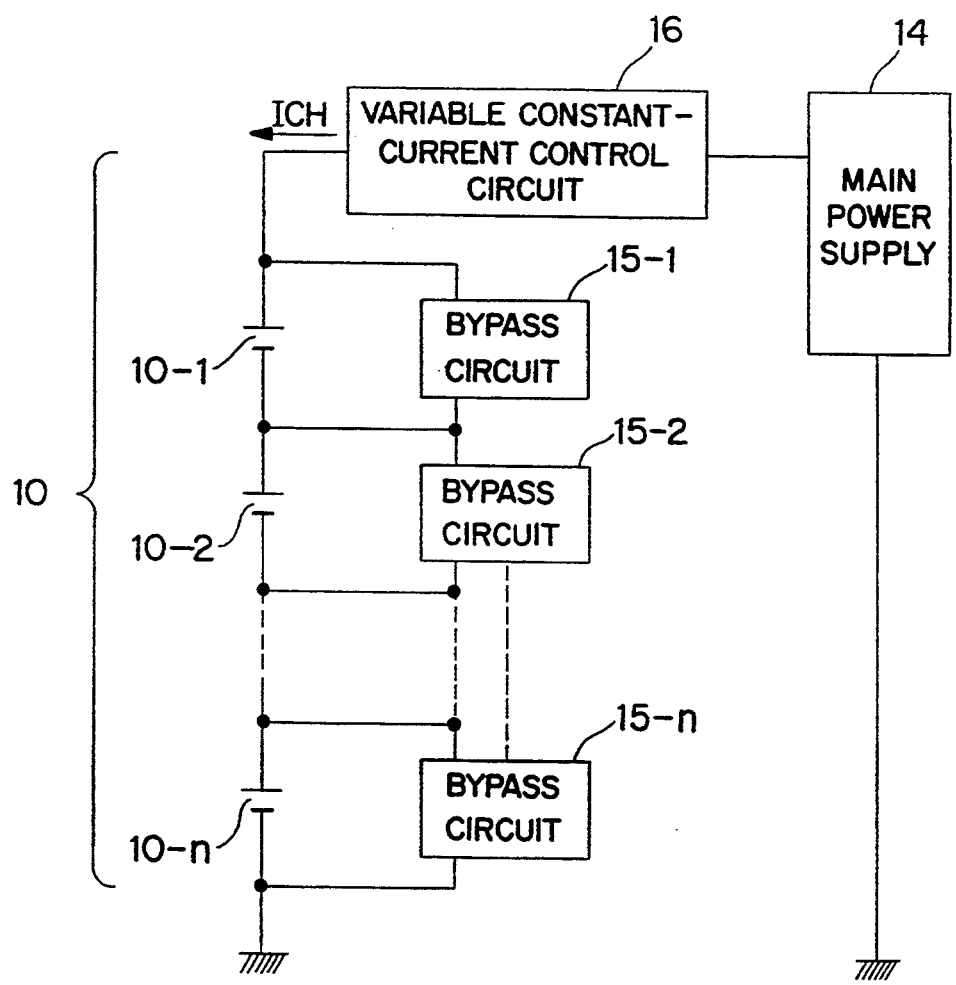
FIG. 2 is a block diagram of a second embodiment implementing a battery charging apparatus in accordance with the present invention.

FIG. 2 is a block diagram of a second embodiment implementing a battery charging apparatus in accordance with the present invention. The same notations and reference numerals as those shown in FIG. 1 are used to denote the same elements/components or their equivalents.

As shown in the figure, bypass circuits 15-1 to 15n are connected in parallel to the battery cells 10-1 to 10-n. To be more specific, each of the bypass circuits 15-1 to 15-n is connected to one of the battery cells 10-1 to 10-n on a one-to-one basis. When the cell voltage Vsx of one of the battery cells 10-1 to 10-n increases to the same level as fully charged voltage VFU, one of the bypass circuits 15-1 to 15-n associated with the battery cell bypasses the charging current therethrough as a bypass current IBP.

Figure 3:
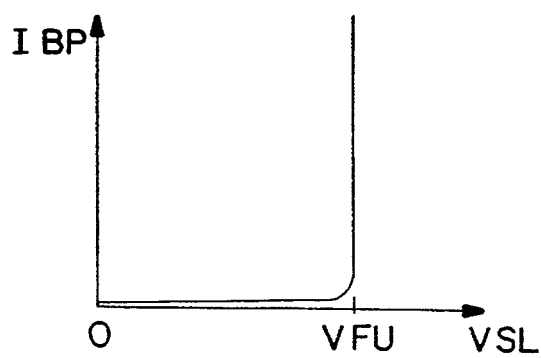
FIG. 3 is a diagram used for explaining the principles of operation of the second embodiment shown in FIG. 2.

FIG. 3 is a diagram illustrating the fully charged voltage VFU as compared to the bypass current IBP and the cell-voltage terminal voltage Vsl.

Figure 4A:
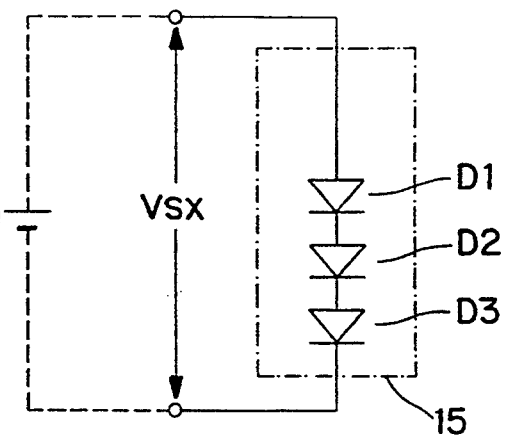
FIGS. 4(a) and 4(b) are diagrams illustrating an embodiment of a bypass circuit shown in FIG. 2.
Figure 4B:
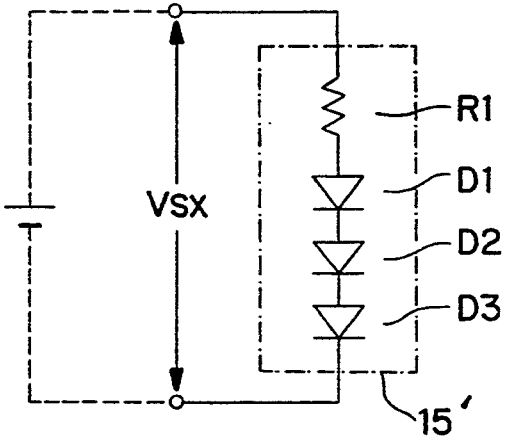

FIGS. 4(a) and 4(b) are diagrams showing the configuration of an embodiment implementing each of the bypass circuits 15-1 to 15-n described above.

As shown in the FIG. 4(a), diodes D1, D2 and D3 are connected in series in the forward direction across the input/output terminals of the bypass circuit 15. The forward-direction voltage along the diodes D1, D2 and D3 is set to the fully-charged voltage VFU.

When the cell voltage Vsx increases to the same level as the fully charged voltage VFU, the diodes D1, D2 and D3 bypass the charging current therethrough so that the battery cell does not deteriorate due to overcharging.

By the way, in the case of the embodiment described above, bypass current starts to flow gradually from an intermediate region before the diodes are completely turned on as the cell voltage Vsx increases. As the cell voltage Vsx rises further, the bypass current also increases as well, causing the diodes D1, D2 and D3 to dissipate heat which reduces the voltage drops across the diodes. The conduction voltage across the diodes D1, D2 and D3 drop at a rate of about −2 mV per degree Celsius.

As a result, current starts flowing out of the battery cell and the cell voltage Vsx can no longer be sustained at the fully charged voltage VFU. In other words, the charging current is bypassed even though the battery cell is not fully charged.

In order to solve the problem, a resistor R1 is connected in series to the diodes D1, D2 and D3 for limiting the bypass current as shown in FIG. 4(b). In such a configuration, the bypass current 15' is limited by the resistor R1. Accordingly, heat is prevented from being dissipated in the diodes D1, D2 and D3. As a result, the discharging of current out of the battery cell can thereby be avoided.

Figure 14:
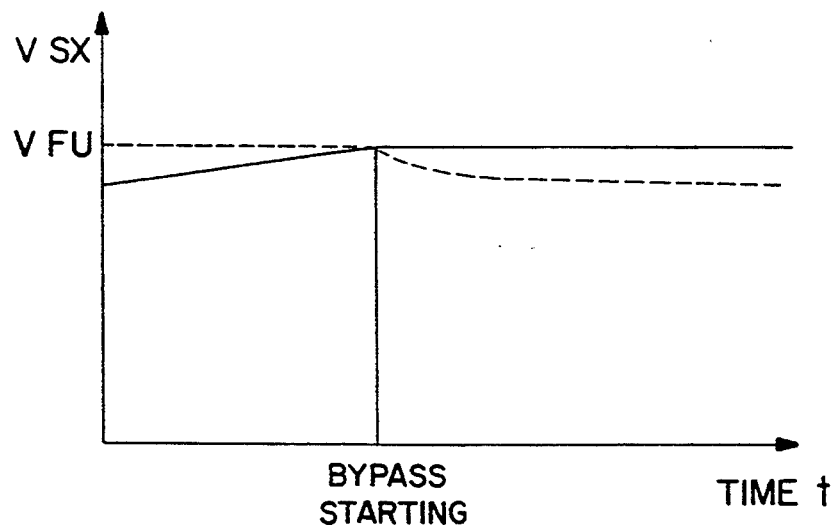
FIG. 14 is a diagram showing a variation in cell voltage.

FIG. 14 is a diagram showing a difference in variation in cell voltage Vsx between the bypass diodes D1, D2 and D3 with a resistor R1 connected and without a resistor being connected. The solid and dashed lines represent a circuit which includes a resistor R1 and a circuit that does not include a resistor, respectively. It is clearly seen from FIG. 14 that by connecting the resistor R1, the voltage drop can be suppressed after the battery cell has been fully charged.

Figure 5:
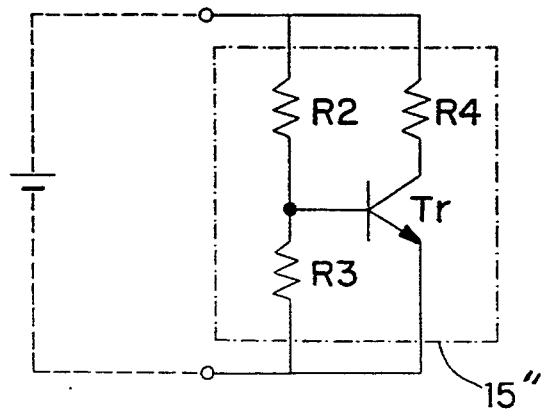
FIG. 5 is a diagram showing another embodiment of the bypass circuit of FIG. 2.

FIG. 5 is a diagram showing the configuration of another embodiment implementing the bypass circuit 15" described above.

As shown in FIG. 5, resistors R2 and R3 are connected in series across the input/output terminals of the bypass circuit 15". The base of a transistor Tr is connected to the junction point between the resistors R2 and R3. The collector of the transistor Tr is connected to the input terminal of the bypass circuit 15' through a resistor R4 whereas its emitter is connected to its output terminal.

In such a configuration, when the cell voltage Vsx increases to the same level as the fully charged voltage VFU, the base voltage of the transistor Tr rises, causing the transistor Tr to turn on. The conducting transistor Tr, in turn, bypasses the charging current therethrough so that the battery cell does not deteriorate due to overcharging.

Figure 6:
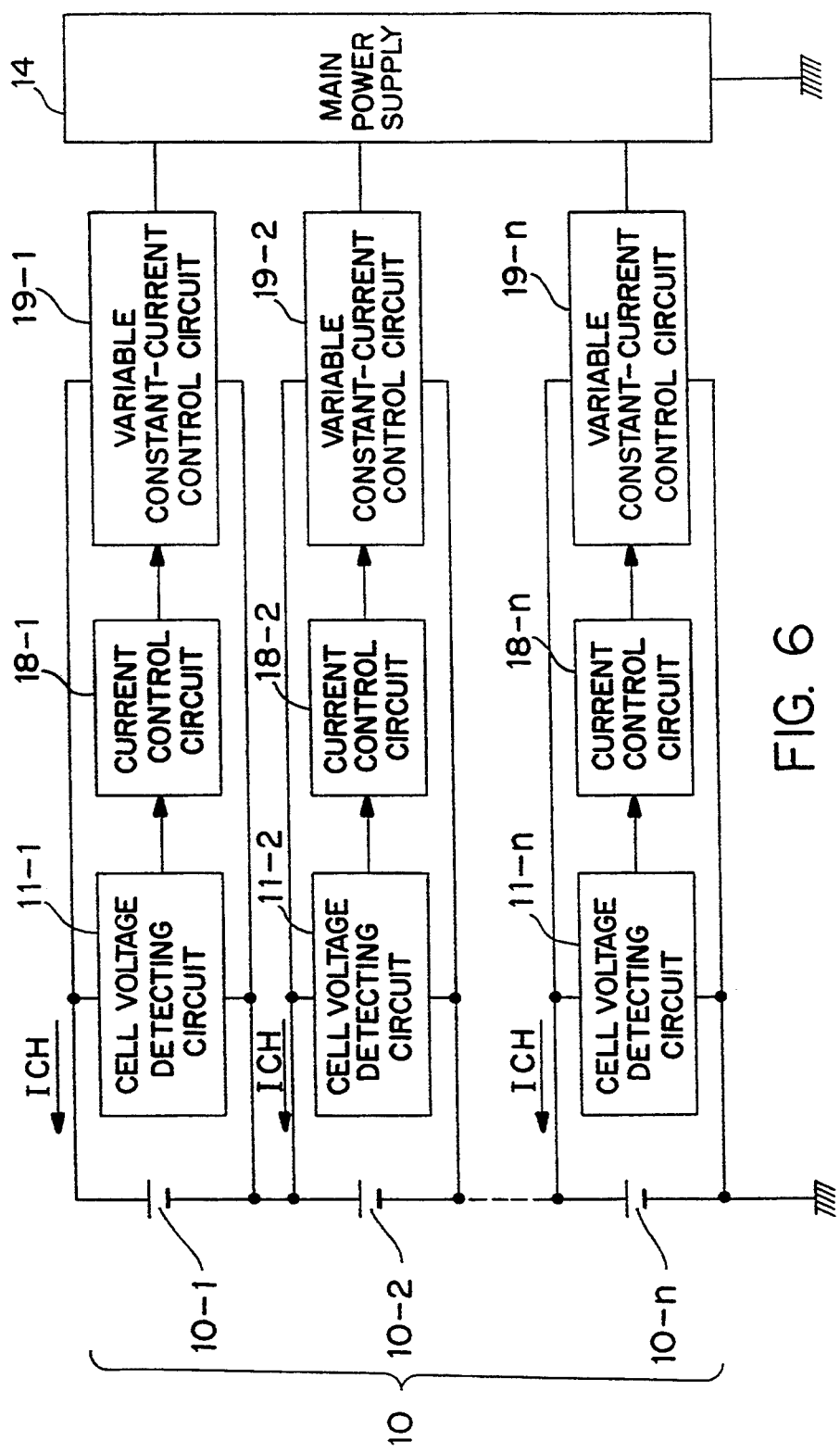
FIG. 6 is a block diagram of a third embodiment implementing a battery charging apparatus in accordance with the present invention.
Figure 7:
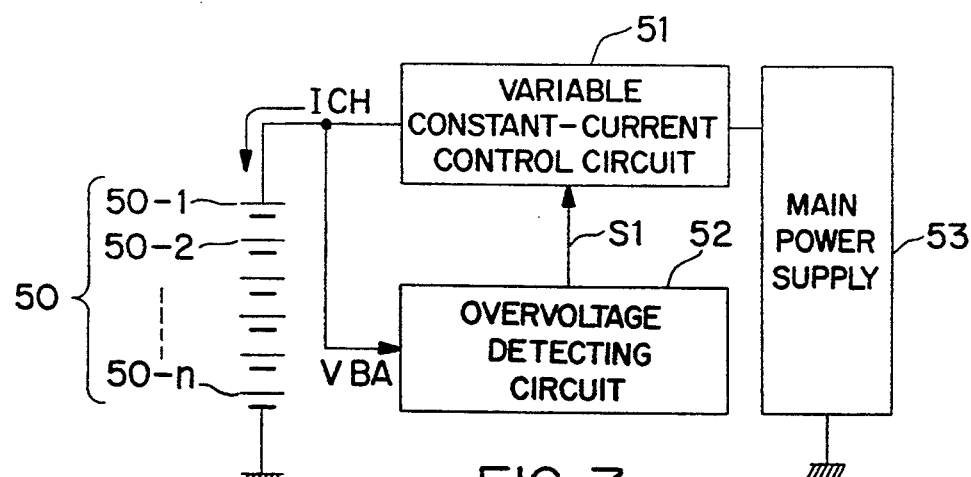
FIG. 7 is a block diagram of a conventional battery charging technique.
Figure 8A:
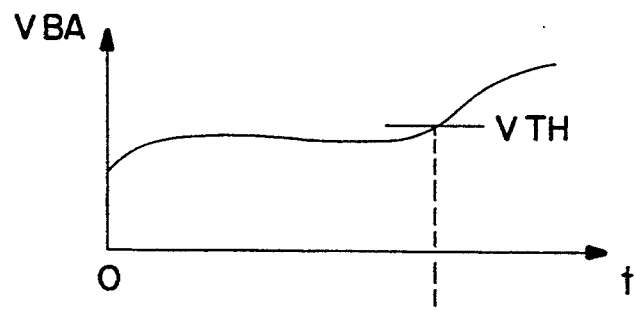
FIGS. 8(a) and 8(b) are diagrams used for explaining the principles of operation of the conventional battery charging technique shown in FIG. 7.
Figure 8B:
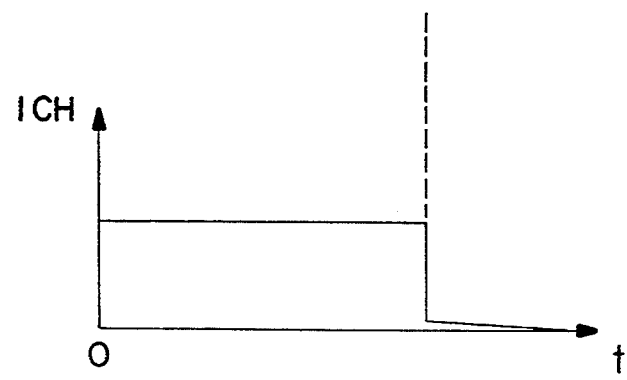
Figure 9:
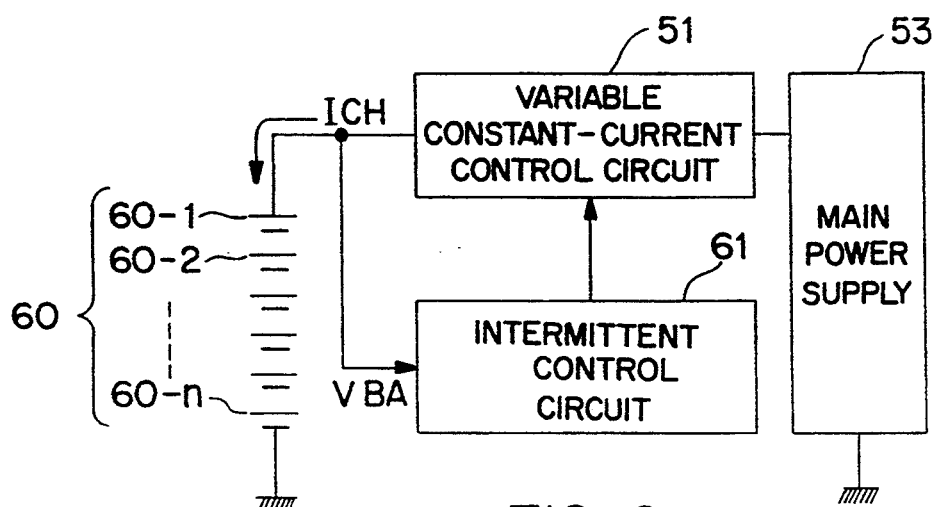
FIG. 9 is a block diagram of another convention battery charging technique.
Figure 10:
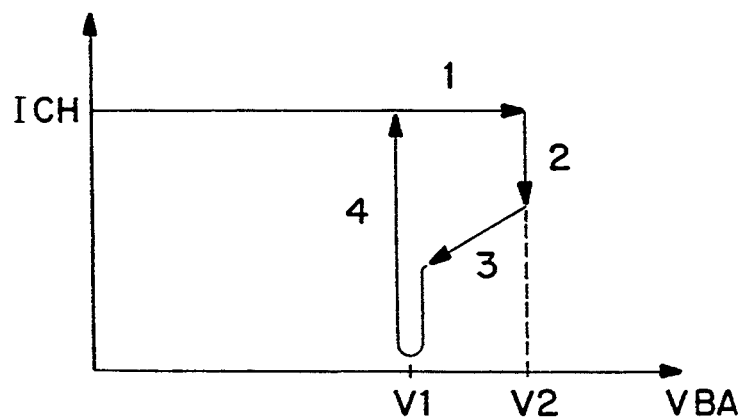
FIG. 10 is a diagram used for explaining the principles of operation of the conventional battery charging technique shown in FIG. 9.
Figure 11:
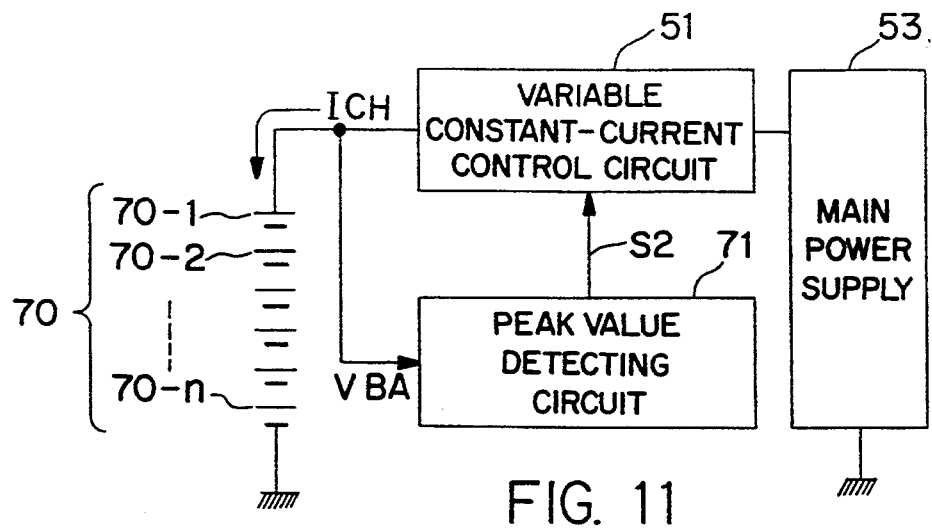
FIG. 11 is a block diagram of still another convention battery charging technique.
Figure 12A:
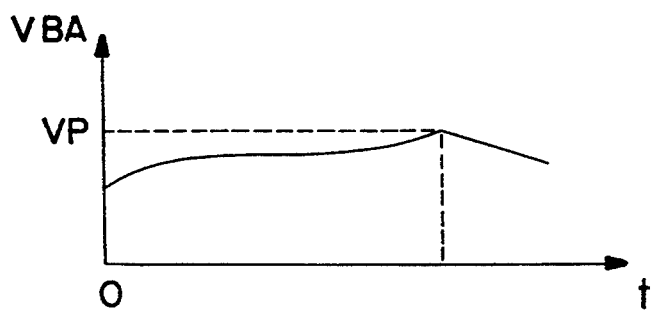
FIGS. 12(a) and 12(b) are diagrams used for explaining the principles of operation of the conventional battery charging technique shown in FIG. 11.
Figure 12B:
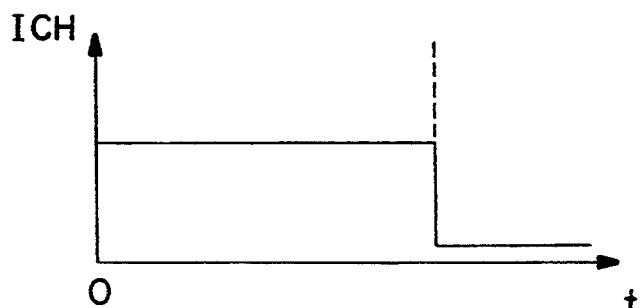

FIG. 6 is a block diagram of a third embodiment implementing a battery charging apparatus in accordance with the present invention. The same notations and reference numerals as those shown in FIG. 1 are used to denote the same elements/components or their equivalents.

In this embodiment, cell-voltage detecting circuits 11-1 to 11-n, current control circuits 18-1 to 18-n and variable constant-current control circuits 19-1 to 19-n are connected in parallel to the battery cells 10-1 to 10-n. To be more specific, each of the cell-voltage detecting circuits 11-1 to 11-n, each of the current control circuits 18-1 to 18-n and each of the variable constant-current control circuits 19-1 to 19-n are connected in parallel to one of the battery cells 10-1 to 10-n as shown in FIG. 6.

When one of the battery cells 10-1 to 10-n is fully charged, increasing its cell voltage Vsx to the same level as the fully charged voltage VFU, the current control circuit 18 associated with the battery cell 10 provides a command signal to the corresponding variable constant-current circuit 19 to stop the electric charging.

Upon receiving the command signal to discontinue the electric charging, the variable constant-current control circuit 19 stops supplying charging current to the battery cell 10.

In this embodiment, each of the battery cells 10-1 to 10-n constituting the set battery 10 undergoes electric charging individually. Accordingly, no battery cell deteriorates due to an overvoltage. In addition, since all the battery cells 10-1 to 10-n can be fully charged, the set battery 10 can be charged effectively to its full capacity.

It has been explained that in this embodiment, the variable constant-current control circuit 19 stops supplying charging current whenever a fully charged state is detected. It should be noted, however, that applications of the present invention are not limited to such a scheme. As described earlier, trickle charging can be carried out instead after a fully charged state has been detected.

Figure 15:
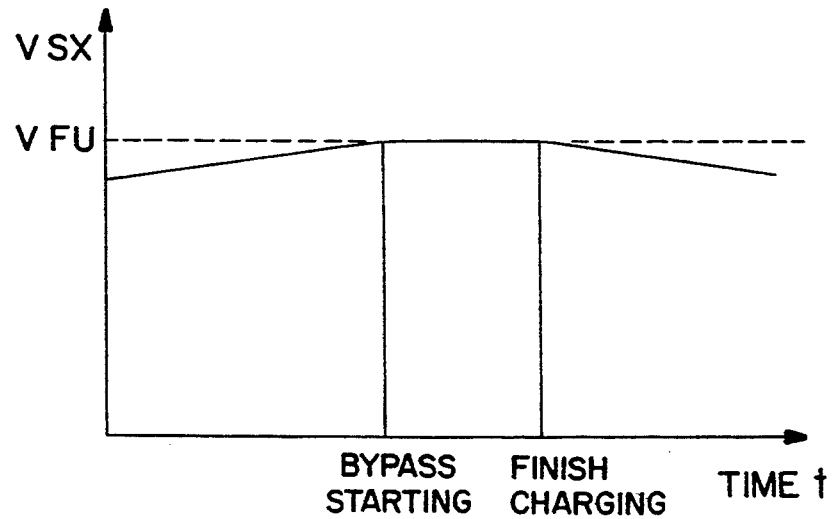
FIG. 15 is a diagram showing another variation in cell voltage.

By the way, in the case of the embodiment explained by referring to FIG. 4(b), a bypass circuit 15 is permanently connected to each of the battery cells 10-1 to 10-n in order to protect the battery against an overvoltage. The existence of such a bypass circuit 15 allows discharging current to flow through its diodes D1, D2 and D3 after the completion of the electric charging, gradually lowering the charged capacity or the cell voltage as shown in FIG. 15.

In order to solve this problem, a fourth embodiment of the present invention is provided. The following is a description of the fourth embodiment which can be used for effectively sustaining each of the battery cells 10-1 to 10-n in its fully charged state.

Figure 13:
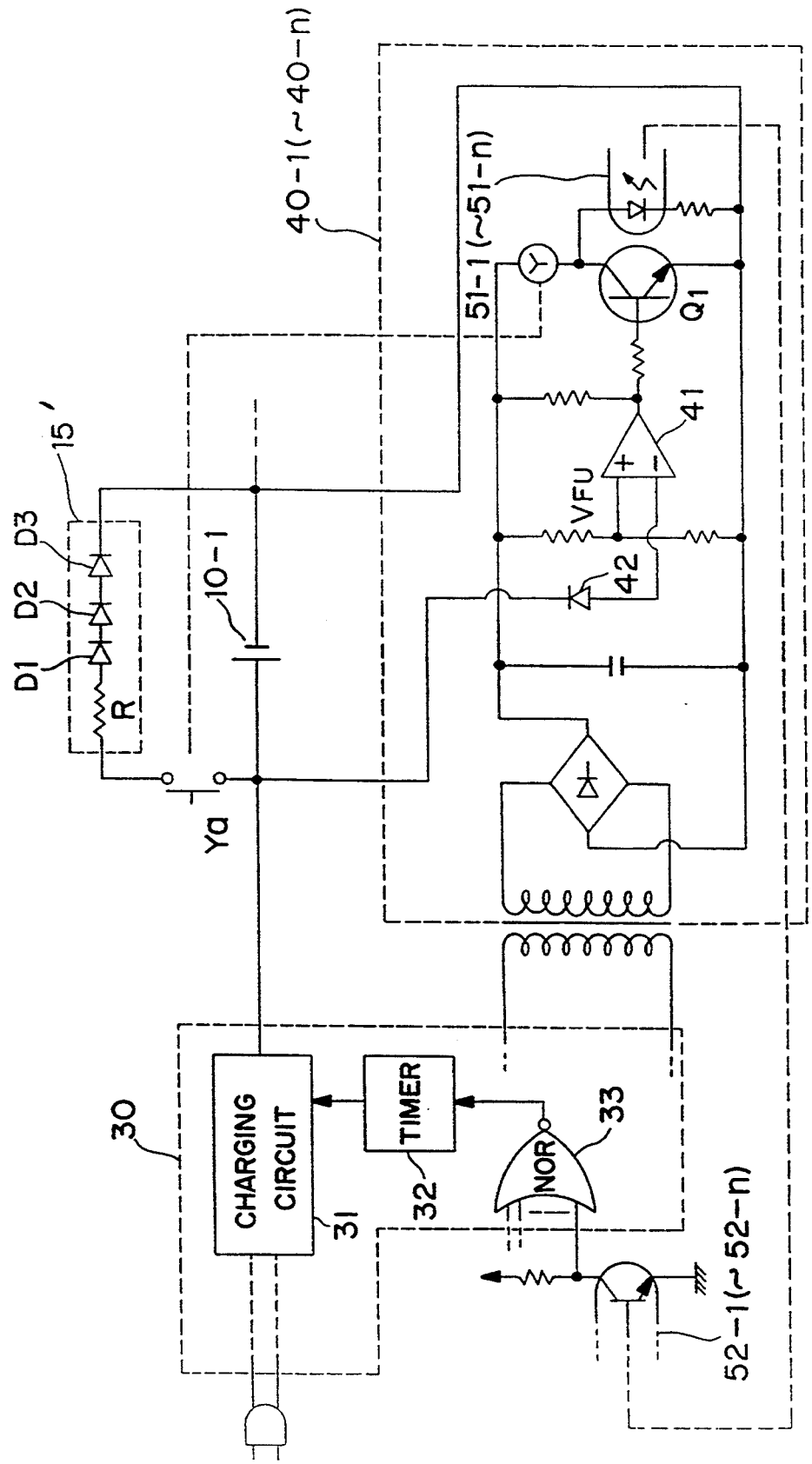
FIG. 13 is a block diagram of a fourth embodiment implementing a battery charging apparatus in accordance with the present invention.

FIG. 13 is a block diagram of the fourth embodiment implementing a battery charging apparatus in accordance with the present invention. The same notations and reference numerals as those shown in the previous figures are used to denote the same elements/components or their equivalent.

As shown in FIG. 13, a normally open switch Ya is connected in series to the input pin of the bypass circuit 15. The switch Ya is closed by a coil Y.

The terminal voltage of the battery cells 10-1 to 10-n forming the set battery 10 are not shown in the figure. Each input to voltage monitoring circuits 40-1 to 40-n also are not shown in the figure. The outputs of phototransistors 52-1 to 52-n, each forming a pair with one of photodiodes 51-1 to 51-n of the voltage monitoring circuits 40-1 to 40-n, are supplied to a multi-input NOR gate 33 of a charger 30.

Note that since each of the voltage monitoring circuits 40-1 to 40-n works in the same way, its principle of operation is explained by referring only to the voltage monitoring circuit 40-1.

The terminal voltage VFU of the battery cell 10-1 in its fully charged state is supplied to the inverting input terminal of a comparator 41 of the voltage monitoring circuit 40-1. Accordingly, when the battery cell 10-1 has not been fully charged yet, a current flows through a diode 42, setting the output of the comparator 41 at a low level. As a result, a transistor Q1 is turned off.

When the transistor Q1 is in a turned-off state, the coil Y is not excited, sustaining the switch Ya in the open state in which electric charging into the battery cell 10-1 is carried out. In addition, when the transistor Q1 is in a turned-off state, the photodiode 51-1 emits light, keeping the associated phototransistor 52-1 in a turned-on state. If the other phototransistors 52-2 to 52-n are also in a turned-on state, the output of the multi-input NOR gate 33 is held at a high level, preventing a timer 32 from starting to count. If one of the phototransistors 52-1 to 52-n is turned off, however, the output of the multi-input NOR gate 33 becomes low.

As the battery cell 10-1 is fully charged, the current no longer flows through the diode 42. Accordingly, the output of the comparator 41 goes high, turning on the transistor Q1. As a result, the coil Y is excited, closing the switch Ya. In this state, the charging current is bypassed through a resistor R and the diodes D1, D2 and D3.

When the transistor Q1 is in a turned-on state, the photodiode 51-1 does not emit light, causing the phototransistor 52-1 to turn off. Accordingly, a high level signal is input to the multi-input NOR gate 33 of the charger 30, putting the output of the multi-input NOR gate 33 to a low level. As a result, the output of the multi-input NOR gate 33 is reduced when one of the phototransistors 52-1 to 52-n is turned off as described earlier. As the output of the multi-input NOR gate 33 is reduced, the timer 32 starts operating. That is to say, the timer 32 starts measuring the time that has elapsed since one of the battery cells 10-1 to 10-n entered a fully charged state. The charging time varies from battery cell to battery cell. Therefore, time information that takes the variations in charging time into account is set in advance in the timer 32. After a period of time since the start of operation of timer 32, within which all the battery cells 10-1 to 10-n have been fully charged elapses, a command signal to halt the charging current is issued to a charging circuit 31.

As the supply of the charging current is stopped, the coil Y enters an unexcited state, opening the switch Ya. Thus, in this embodiment, none of the battery cells 10-1 to 10-n are discharged because of prolonged discharging current.

It has been explained that in this embodiment, the switch Ya is connected in series to the bypass circuit 15 described by referring to FIG. 4(a). It should be noted, however, that the switch Ya can also be connected in series to the bypass circuit 15' described by referring to FIG. 4(b) or the bypass circuit 15" of FIG. 5. By doing so, the discharging current is disconnected as well after the electric charging has been completed, thus resulting in the same effect.

In addition, it should be noted that embodiments implementing a battery charging apparatus in accordance with the present invention are not limited to the configurations described above. The present invention can be applied to all battery charging apparatuses wherein charging current supplied to a battery configured to comprise a plurality of battery cells connected to each other in series is controlled by monitoring the terminal voltage of each battery cell.

It has been explained that charging current is controlled by individually monitoring the terminal voltages of the battery cells constituting a set battery. It should further be noted, that the battery cells can be divided into groups each comprising a plurality of battery cells with small variations in capacity and, thus, in electric charge. In such a configuration, the charging current can, therefore, be controlled by monitoring the terminal voltage of each group.

It is obvious from the above description that the present invention allows charging current to be controlled by judging whether or not each of the battery cells constituting a battery has been fully charged. Thus, the battery can be prevented from deteriorating due to an overvoltage.

Figure 19:
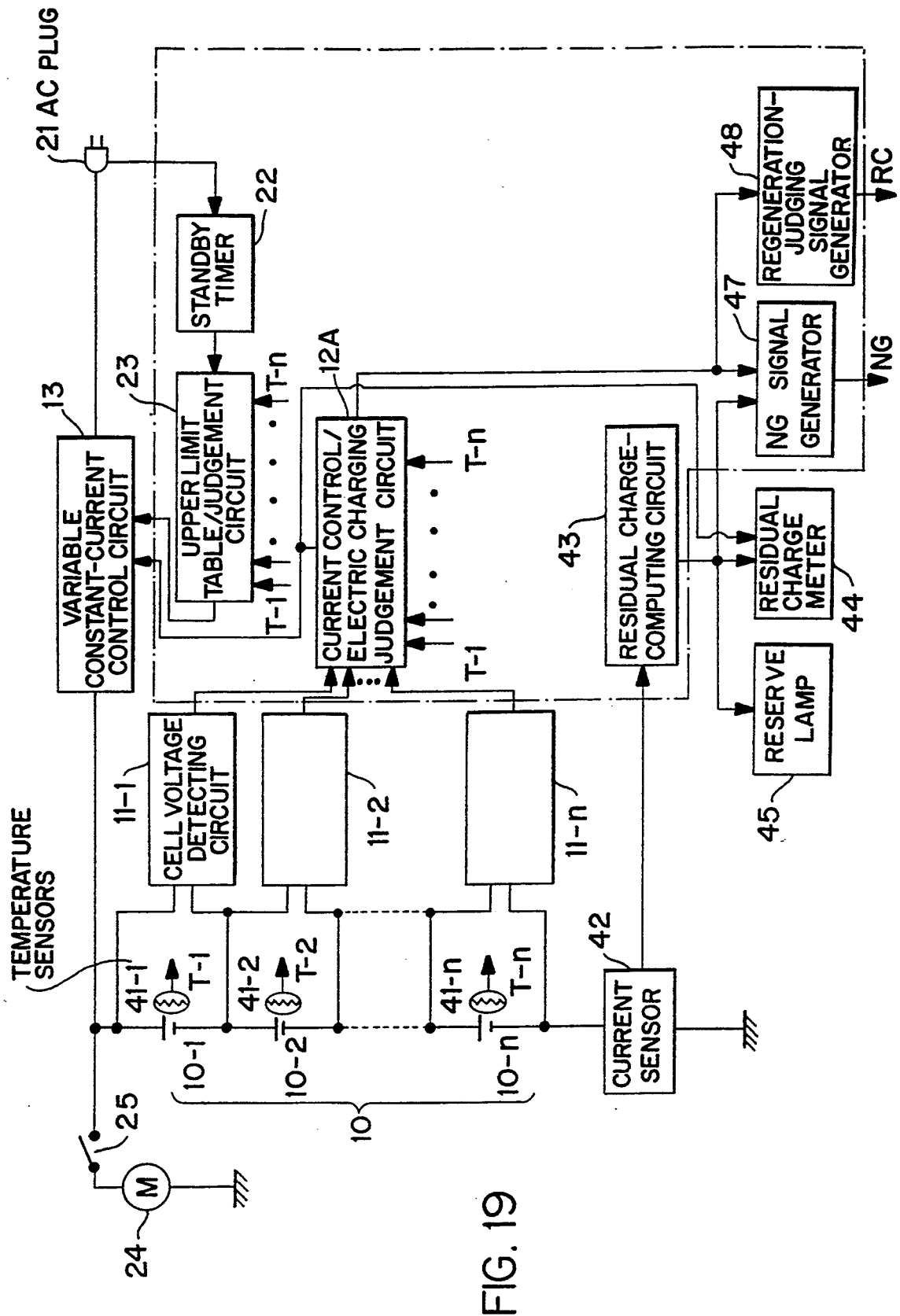
FIG. 19 is a block diagram of a further embodiment of the present invention.

FIG. 19 illustrates an additional embodiment of the present invention. As a variable constant-current control circuit 13 is connected to the AC power supply by either inserting an AC plug 21 into an AC socket or turning on an AC power-supply switch, a stand-by timer 22 is activated to start measuring the time lapse. Temperature sensors, such as temperature-sensitive resistors 41-1 to 41-n, may be attached to the battery-cell groups 10 to 10-n at appropriate locations such as connection surfaces exposed to adjacent battery-cell groups. Outputs T-1 to T-n of the temperature sensors 41-1 to 41-n representing monitored temperatures of the battery-cell groups are supplied to a current-control/electric-charging judgement circuit 12A and an upper-limitable/judgement circuit 23. The upper-limitable/judgement circuit is used for storing maximum temperatures as functions of times lapse since the connection of the variable constant-current control circuit to the AC power supply. Note that a maximum temperature is defined as an upper limit of temperatures at which a battery-cell group should be charged. A battery-cell group should not undergo electric charging at a temperature above the upper limit.

The determination of the upper limits is based on the following concept. In general, it is desirable to charge a battery at as low a temperature as possible. This is because if a battery is charged at a low temperature, the electric charging can be performed efficiently and the generation of oxygen can be suppressed. Accordingly, the life of the battery can be lengthened. On the other hand, it may take a long time for a discharged battery to wait until its temperature is reduced to a sufficiently low value. If that is the case, it will take a long time to wait until the temperature of the battery reaches the low value and the electric charging will become impractical.

A compromising configuration is adopted in this embodiment as follows. Eight Ni-Zn battery cells are connected in series to constitute a battery-cell group and four battery-cell groups are formed into a set battery. An experiment was carried out on a set-battery charging apparatus for vehicles using such a battery set. For a time lapse since the connection of the current control circuit to the AC power supply until the start of the electric charging which is shorter than two hours, the upper limit is set at 25 degrees Celsius. For a time lapse which is longer than two hours, the upper limit is set at 40 degrees Celsius. With the upper limits set in this way, results satisfactory enough for practical use were obtained from the experiment. In this experiment, the upper limits have been set by assuming that it takes seven to eight hours to complete electric charging or electric charging starting at night must be finished in the morning of the following day. It is needless to say that different values may be adopted for the upper limits. Taking the above requirements into consideration, however, it is apparent that the longer the time lapse, the higher the value at which the upper limit should be set.

The upper-limit-table/judgement circuit 23 reads a maximum temperature from an upper-limit table that corresponds to a time lapse, comparing it to the monitored temperatures T-1 to T-n of the battery-cell groups. When all the monitored temperatures T-1 to T-n have decreased to values below the maximum temperature, the variable constant-current control circuit 13 is activated to actually start electric charging into the set battery.

Figure 16:
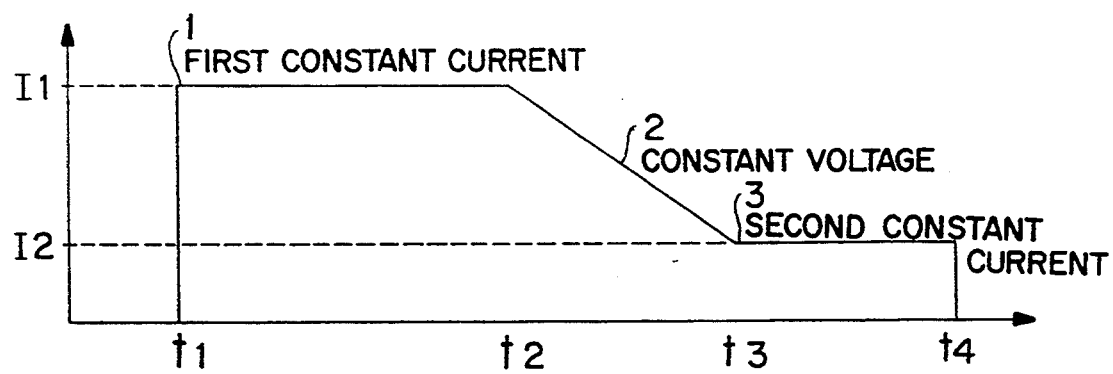
FIG. 16 is a block diagram of a fifth embodiment implementing a battery charging apparatus in accordance with the present invention.

The electric charging is controlled by the current-control/electric-charging judgement circuit 12A as follows. FIG. 16 is a diagram showing states of the electric-charging control or changes in electric-charging mode in the embodiment.

At a time t0, the current control circuit is connected to the AC power supply but actual electric charging is not started immediately. As described above, a time t1 to start the electric charging is determined depending upon the time lapse since the time t0 and the temperatures of the battery-cell groups 10-1 to 10-n. At the time t1, a first-state electric charging is started, supplying a first constant current. The magnitude of the first constant current is determined so as to suppress the generation of oxygen in each battery cell. The magnitude of the first constant current is so selected that the amount of the generated oxygen falls within a permissible range. At the same time, it is desirable to set the magnitude of the first constant current at as large a value as possible. In the experiment carried out by the inventors of the present invention, the magnitude of the first constant current was set at 6.6 A.

As the electric charging is carried forward, the terminal voltages of the battery-cell groups 10-1 to 10-n increase gradually. Much like the embodiments described previously, the terminal voltages of the battery-cell groups 10-1 to 10-n are monitored by cell-voltage detecting circuits 11-1 to 11-n and the monitored values are supplied to the current-control/electric-charging judgement circuit 12A. At a time t2, the terminal voltages attain an intermediate target level which has a predetermined magnitude, typically 80 to 90% of the fully charged voltage level. At the time t2, the electric charging is switched to a second-stage charging mode. It should be noted that the terminal voltage of a battery-cell group decreases with an increase in battery temperature. Accordingly, it is necessary to apply a temperature compensation expressed by Equation 1 to the intermediate target level as follows:

Compensated Intermediate Target Level (Eq. 1)

$$\{\% * \text{Fully Charged Voltage Level at 0 degrees Celsius} -$$
$$0.016 \, [\nu/\text{degree Celsius}] *$$
$$\text{battery temperature [degrees Celsius]}\} \, [V]$$

In the experiment carried out by the inventors of the present invention, the intermediate target level was set at 90% of the fully charged voltage. Substituting this value into Eq. 1, the following equation is obtained.

Compensated Intermediate Target Level =

$$\{15.6 - 0.016 \, [\nu/\text{degree Celsius}] *$$
$$\text{battery temperature [degrees Celsius]}\} \, [V]$$

At the second-stage, the electric charging is carried out in a constant-voltage mode in order to sustain the terminal voltages of the battery cell groups 10-1 to 10-n at the maximum level given by Eq. 1, a voltage level attained at the time t2. While the electric charging is being carried out in the second-stage mode, the charging current gradually decreases with the lapse of the time. On the other hand, the generation of oxygen in the battery cell accompanying the electric charging is increasing. At a time t3, the amount of oxygen generated in the battery cell reaches a permissible upper limit. At that time, the electric charging is switched to a third-stage constant-current charging mode. The magnitude of charging current by which the amount of the generated oxygen attains the permissible upper limit has been verified empirically in advance. According to experiments conducted by the inventors of the present invention, the magnitude of such charging current is 3.4 A. This magnitude is then used as a current target value at which the electric charging is switched to the third-stage mode.

At the third-stage, electric charging is carried out in a constant-current mode. In this mode, the amount of oxygen generated in the battery cell is kept within the permissible limit by sustaining the charging current at a magnitude set at the switching time t3. The magnitude of current set at the time t3 is known as a second constant-current value. As the electric charging is carried forward in the third-stage mode, the maximum value of the terminal voltages of the battery-cell groups 10-1 to 10-n gradually increases, approaching 100% of the fully charged level. At a time t4, the maximum value of the terminal voltages of the battery-cell groups 10-1 to 10-n finally attains 100% of the fully charged level. At that time, the electric charging is completed. Much like the intermediate target value, a temperature compensation expressed by Equation 2 is applied to the final target value of the maximum of the terminal voltages as follows:

Compensated Final Target Level = (Eq. 2)

$$\{100\% * \text{Fully Charged Voltage Level at 10 degrees Celsius} -$$

-continued $$0.016 \text{ [v/degree Celsius]} * \text{battery temperature [degrees Celsius]} \} \text{ [V]}$$

In the experiment carried out by the inventors of the present invention, the following equation was used in the criterion for completing the electric charging.

Compensated Final Target Level =

$$\{15.7 - 0.016 \text{ [V/degree Celsius]} * \text{battery temperature [degrees Celsius]}\} \text{ [V]}$$

It should be noted that criteria for completing electric charging can be established experimentally. Techniques for appropriately completing electric charging include detection of an abrupt temperature increase in the battery cell and detection of a delta peak. Accordingly, the maximum terminal voltage of a battery-cell group at which electric charging is to be completed can be determined in advance by experiments. When the electric charging has been completed, the charging current can be cut off immediately. As an alternative, trickle charging can be carried out instead, following the completion of the electric charging as described previously. As illustrated in FIG. 16, during a period between the connection of the variable constant-current control circuit 13 to the AC power supply and the completion of the electric charging, the set-battery charging apparatus is in a state waiting for the electric charging to start followed by a state in which the first to third stages of the electric charging take place. During the period, it is desirable to turn on an electric-charging lamp.

It has been explained that electric charging is halted as the third stage is ended. It is desirable, however, to terminate the electric charging as one of the events listed below is detected.

(1) The time lapse since the start of the electric charging exceeds a predetermined period, for example, twelve hours.

(2) The time lapse since the start of the third-stage electric charging exceeds a predetermined period, for example, two hours.

(3) The terminal voltage of a battery-cell group drops by more than a predetermined value, for example 0.5 V, during the electric charging.

(4) A main switch denoted by reference numeral 25 FIG. 13 of a motor 24 on the load side of the set-battery is turned on.

(5) The commercial AC power supply for the electric charging is cut off.

A current sensor 42 is used for monitoring discharging current flowing out off the set battery. A detection signal output by the current sensor is supplied to a residual-charge computing circuit 43. The residual-charge computing circuit 43 calculates the amount of residual charge in the set battery by integrating the detection signal. The residual-charge computing circuit 43 provides a residual-charge meter 44 with a signal such as a pulse width modulation signal which represents the computed residual charge in the set battery. Upon receiving such a signal, the residual-charge meter 44 displays the calculated residual charge. The residual-charge meter 4 is calibrated to "FULL" indicating a 100% charged state by a signal coming from the current-control/electric-charging judgement circuit 12A each time the electric charging is completed as described above. When the residual-charge computing circuit 43 identifies a state in which the residual charge in the set battery goes below a predetermined value, it is necessary to recharge the set battery. At that time, the residual-charge computing circuit issues a warning by, for example, turning on a reserve lamp 45.

An NG-signal generator 47 outputs an NG signal when the residual charge in the set battery drops to a predetermined amount, for example, 0 Coulomb or when the minimum of the terminal voltages of the battery-cell groups 10-1 to 10-n goes below a predetermined value. The NG signal opens the motor switch 25 halting the motor 24. The minimum terminal voltage can be expressed by Equation 3, a typical equation, as follows:

Minimum Terminal Voltage = (Eq. 3)

$$\{11.2 - 0.016 \text{ [v/degree Celsius]} * \text{battery temperature [degrees Celsius]}\} \text{ [V]}$$

If the motor is included as a load of the set battery, a regeneration-judging signal generator 48 is used for generating a regeneration judging signal RC in accordance with the magnitude of the maximum terminal voltage of the battery-cell groups 10-1 to 10-n. If the maximum terminal voltage is greater than a predetermined value, regenerative electric charging is inhibited in order to protect the set battery against an overvoltage. In the experiments carried out by the inventors of the present invention, the regeneration judging signal RC was set to work in accordance with the following typical conditions. If the maximum of the terminal voltages of the battery-cell groups 10-1 to 10-n is greater than a value predetermined by Equation 4, the regenerative electric charging is inhibited. On the contrary, if it is smaller than a predetermined value expressed by Equation 5, the regenerative electric charging is enabled.

$$\{15.1 - 0.016 \text{ [V/degree Celsius]} * \text{battery temperature [degrees Celsius]}\} \text{[V]} \quad \text{(Eq. 4)}$$

$$\{14.8 - 0.016 \text{ [V/degree Celsius]} * \text{battery temperature [degrees Celsius]}\} \text{[V]} \quad \text{(Eq. 5)}$$

Figure 17:
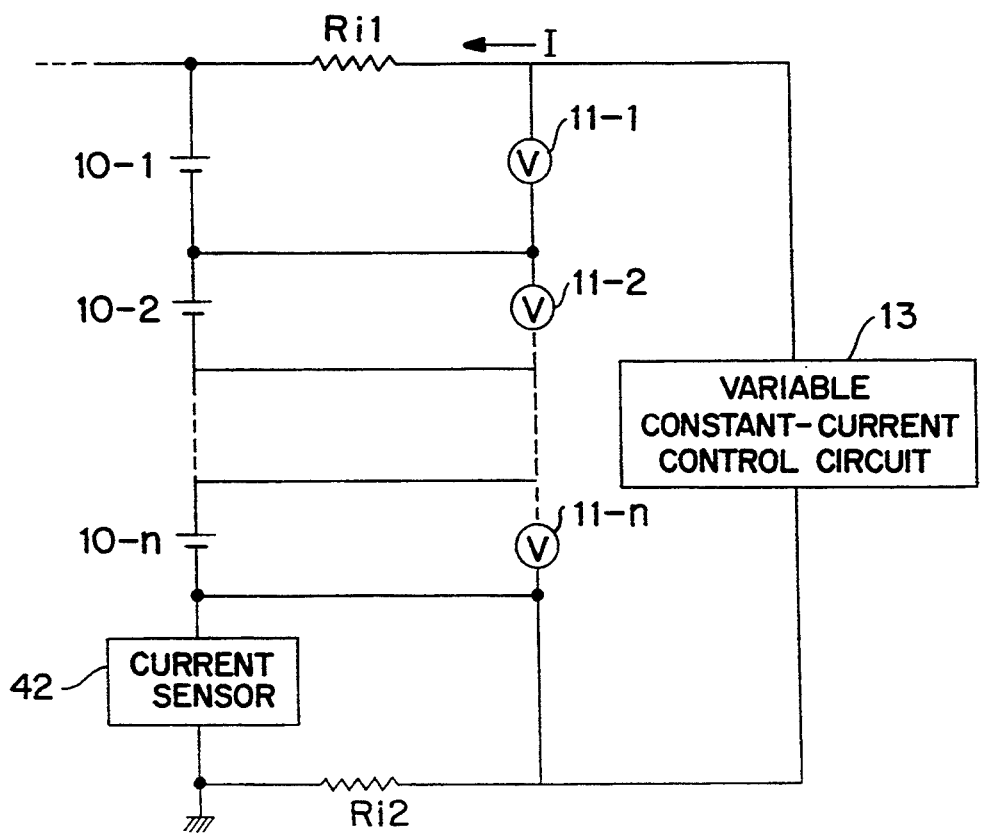
FIG. 17 is a block diagram of a sixth embodiment implementing a battery charging apparatus in accordance with the present invention.

In the embodiment shown in FIG. 17, the input terminals of the cell-voltage detecting circuits 11-1 to 11-n are each directly connected to the terminals of one of the battery-cell groups 10-1 to 10-n. In order to shorten the length of the wires, the measuring lines attached to the one-side terminals of the cell-voltage detecting circuits can be connected to the circuit lines for the flow of charging current instead of the terminals of the high-potential and/or low-potential battery cells 10-1 and/or 10-n. In this case, voltage drops across internal resistors of the circuit lines for the flow of charging current, the current sensor and the like give rise to measurement errors. Notations Ri1 and Ri2 shown in FIG. 17 are equivalent resistors of such internal resistors which are referred to hereafter as merely charging-wire resistors. As such, there is a risk of deteriorating control performance of the electric charging described earlier caused by such measurement errors. In order to eliminate the cause of the measurement errors, the following countermeasure is taken.

First of all, the terminal voltages of the battery-cell groups 10-1 to 10-n, specially the high-potential and low-potential battery-cell groups 10-1 and 10-n, are measured immediately before the electric charging is started. Since no current actually flows through the charging wires, the measurement values can be regarded as true terminal voltages of the battery-cell groups 10-1 and 10-n. Right after the electric charging supplying the aforementioned first constant current shown in FIG. 16, or several hundred seconds later, the above measurement is repeated. It is obvious from FIG. 16 that the measurement values obtained at this time represent the sums of true terminal voltages of the battery-cell groups 10-1 and 10-n and the voltage drops across the equivalent wire resistors Ri1 and Ri2. Since no electric charging is virtually carried out on the battery-cell groups 10-1 to 10-n, their terminal voltages should have remained unchanged.

Accordingly, by subtracting the first measurement results from the second ones, the voltage drops across the charging-wire resistors can be found. The values of the voltage drops can thus be used later as compensating values when deriving true terminal voltages of the battery-cell groups 10-1 to 10-n from measurement results. Furthermore, the resistances of the charging-wire resistors can be found from the values of the voltage drops and the first constant current I1. Accordingly, when the magnitude of the charging current changes, the values of the voltage drops across the charging-wire resistors can be updated from the new values of the charging current and the resistances of the charging-wire resistors. The updated values of the voltage drops can also be used for correction as well. It should be noted that similar compensation can be applied to the measurement of the terminal voltages across the battery-cell groups 10-2 to 10(n-1) connected at the middle of the series circuit in the set battery. In addition, any appropriate known current value can be used for calculating the voltage drops and the resistances of the charging-wire resistors instead of the first constant current I1.

As described previously with respect to FIG. 19, the output of the current sensor 42 is integrated by the residual-charge calculating circuit 43. Since an operational amplifier or the like is used for amplifying the output of the current sensor, there is a risk of also accumulating an error in the computed result due to an offset of the operational amplifier. The magnitude of such an error can be reduced by using the offset output by the operational amplifier at a residual charge of 0 Coulomb as a correcting parameter. It is, thus, necessary to store in advance the offset at a zero residual charge. In this way, the residual charge in the set battery can be monitored more accurately.

It is readily obvious that the setting of the timing to start electric charging and the setting of the electric-charging modes, the control techniques for starting and halting the electric charging, the technique for monitoring residual charge in the set battery, the criterion for enabling and disabling regenerative electric charging, the function for compensating measured values of the terminal voltages and the current of the battery-cell groups and other functions adopted by the embodiment shown in FIG. 13 can, of course, be applied to the other embodiments described earlier. Note that other components including a microcomputer may be utilized together with the present invention.

It is clear from the description given so far that in a set-battery charging apparatus provided by the present invention, the charging current is controlled by checking individually whether or not each of the battery-cell groups constituting the set battery has entered a fully charged state, so that fast and perfect electric charging can be realized while preventing the set-battery from deteriorating or being damaged due to overcharging.

Figure 18:
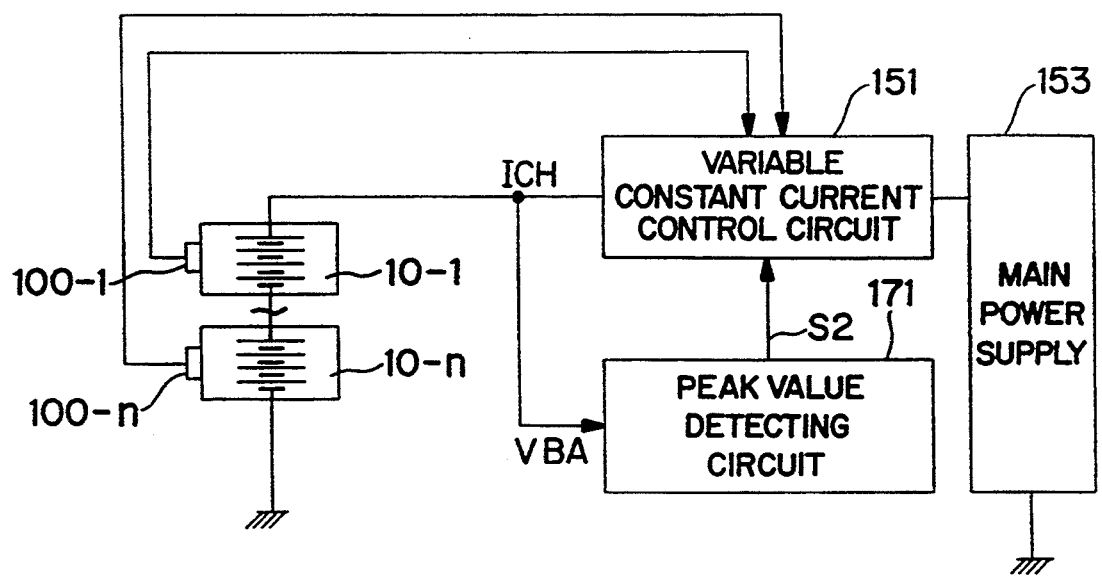
FIG. 18 is a block diagram of a temperature sensor in combination with a battery charging apparatus.

FIG. 18 is a block diagram illustrating temperature sensors 100-1 to 100-n operatively connected to battery cell groups 10-1 to 10-n. The temperature sensors 100-1 to 100-n will provide a signal which is transmitted to the variable constant-current control circuit 151. A peak value detecting circuit 171 operatively connected to the variable constant-current control circuit 151 for supplying a signal S2 for controlling the operation of the constant-current control circuit 151. A main power supply 153 is operatively connected to the variable constant-current control circuit 151 for supplying electric power thereto.

In operation, a stand-by timer is activated to start measuring the time lapse. Electric power is supplied from the main power supply 153 to the variable constant-current control circuit 151. Temperature sensors 100-1 to 100-n are attached to the battery cell groups 10-1 to 10-n for providing an output signal for monitoring the temperatures of the battery cell groups. The output signals of the temperature sensors 100-1 to 100-n are supplied to the variable constant-current control circuit 151. An ICH or optimum charging current is supplied to the battery cell groups 10-1 to 10-n. A VBA or series voltage is supplied to the peak value detecting circuit 171 to provide a control signal S2 to the variable constant-current control circuit 151.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery charging apparatus comprising:
  a plurality of battery cell groups connected to each other in series, each battery cell group including at least one battery cell;
  control means for controlling an electric charge supplied to said plurality of battery cell groups;
  monitor means for detecting the respective terminal voltages of each of said plurality of battery cell groups; and
  detecting means for detecting the respective temperatures of each of said plurality of battery cell groups, said control means terminating the electric charge supplied to said plurality of battery cell groups as a function of a predetermined terminal voltage and temperature of said plurality of battery cell groups wherein an upper limit of a predetermined temperature of said battery cell groups is utilized in advance for determining a start time of current charging as a function of time lapse from initial actuation of the battery charging apparatus, electric charging commencing once the detected respective temperatures of said plurality of battery cell groups are below the upper limit.

2. The battery charging apparatus of claim 1, wherein said control means charges said plurality of battery cell groups in stages comprising:

a first stage wherein a relatively large current is supplied in a constant current mode until the detected terminal voltage of one of said plurality of battery cell groups increases to a first predetermined voltage level set in advance as a function of temperature;

a second stage following completion of said first stage wherein a charging current is supplied in a constant voltage mode in order to sustain the terminal voltage of one of said plurality of battery cell groups having a predetermined temperature at said first predetermined voltage level until the charging current decreases to a predetermined value; and a third stage following completion of said second stage wherein a relatively small current is supplied in a constant current mode until the terminal voltage of one of said plurality of battery cell groups increases to a second predetermined voltage level set in advance as a function of temperature.

3. The battery charging apparatus of claim 2, wherein the magnitudes of said currents supplied in said constant current modes are preset so that the amount of oxygen generated in each battery cell of said plurality of battery cell groups is maintained below a predetermined value.

4. The battery charging apparatus of claim 2, wherein said control means terminates the charging current at the completion of said third stage upon detecting during a predetermined time lapse from the start of said first stage or said third stage that the terminal voltage of at least one of said plurality of battery cell groups has decreased by a voltage drop exceeding a predetermined value.

5. The battery charging apparatus of claim 2, further comprising:
regenerative charging means for charging said plurality of battery cell groups with a motor used as a load; and
inhibit means for inhibiting regenerative charging when a terminal voltage of one of said plurality of battery cell groups exceeds a predetermined value.

6. The battery charging apparatus of claim 2, further comprising:
current sensor means for monitoring discharging current flowing out of said plurality of battery cell groups;
residual change computing means for computing the amount of residual charge in said plurality of battery cell groups by integrating a signal output by said current sensor; and
residual charge meter means for receiving a residual charge signal output by said residual charge computing means and for displaying data indicative of residual charge, said residual charge meter means being calibrated in response to a full charge by said control means.

7. The battery charging apparatus of claim 2, wherein said monitor means computes differences between the terminal voltages of said plurality of battery cell groups detected immediately before the start of electric charging and the terminal voltages of said plurality of battery cell groups detected immediately after the start of electric charging, the charging current having a known magnitude,
the computed differences between terminal voltages being used to correct subsequently detected values of terminal voltages detected by said monitor means.

8. The battery charging apparatus of claim 2, wherein said plurality of battery cell groups are charged via charging wire resistors,
said monitor means computes differences between the terminal voltages of said plurality of battery cell groups detected immediately before the start of electric charging with a constant current of known magnitude and the terminal voltages of said plurality of battery cell groups detected immediately after the start of electric charging and computes resistances of said charging wire resistors by dividing the computed differences by the known magnitude of said constant current,
said monitor means correcting subsequently detected values of the terminal voltages using the computed resistances of said charging wire resistors and the value of the charging current.

9. A battery charging apparatus comprising:
a plurality of battery cells connected to each other in series;
charging means, coupled to said battery cells, for supplying an electric charge to said battery cells, said charging means being powered by main power supply means;
a plurality of bypass means, each coupled in parallel to a respective one of said battery cells, for bypassing the electric charge around said battery cells;
a plurality of monitoring means, each coupled in parallel to a respective one of said battery cells, for monitoring terminal voltages of said battery cells; and
control means, coupled to said plurality of monitoring means and said charging means, for controlling the electric charge supplied to said battery cells upon detection of a predetermined terminal voltage of any one of said plurality of monitoring means;
said plurality of bypass means each comprising:
shunt means for bypassing the electric charge therethrough when a terminal voltage of the respective battery cell is fully charged, and
switch means, coupled in series with said shunt means, for passing the electric charge bypassed through said shunt means when actuated, to bypass the electric charge around the respective battery cell, said plurality of monitoring means each comprising:
cell-voltage detecting means, coupled to a respective battery cell, for detecting the respective terminal voltage of the respective battery cell, and
switch actuating means, coupled to said cell voltage detecting means and to a respective one of said switch means of a corresponding one of said bypass means coupled to the respective battery cell, for activating said switch means in accordance with an output of said cell-voltage detecting means indicative that the respective battery cell is fully charged.

10. The battery charging apparatus of claim 9, wherein said charging means comprises:
current controlling means for controlling current charged into said battery cells from said main power supply means in accordance with the terminal voltages detected by said cell-voltage detecting means.

11. The battery charging apparatus of claim 9, wherein said shunt means comprises diodes coupled in series.

12. The battery charging apparatus of claim 11, wherein said shunt means further comprises a resistor coupled in series to said diodes for limiting current passing through said diodes.

13. The battery charging apparatus of claim 9, wherein said control means comprises:
time measuring means, coupled to said switch actuating means of said plurality of monitoring means and said charging means, for measuring when a predetermined time period has elapsed from when one of said switch actuating means actuates a respective switch means and for terminating the supply of the electric charge from said charging means after said predetermined time period has elapsed.

14. The battery charging apparatus of claim 13, wherein each of said switch actuating means are coupled to said control means via respective photodiode/phototransistor pairs.

15. A battery charging apparatus comprising:
a plurality of battery cell groups connected to each other in series;
charging means, coupled to said battery cells, for supplying an electric charge to said battery cell groups, said charging means being powered by main power supply means;
a plurality of bypass means, each coupled in parallel to a respective one of said battery cell groups, for bypassing the electric charge around said battery cell groups;
a plurality of monitoring means, each coupled in parallel to a respective one of said battery cell groups, for monitoring terminal voltages of said battery cell groups; and
control means, coupled to said plurality of monitoring means and said charging means, for controlling the electric charge supplied to said battery cell groups upon detection of a predetermined terminal voltage by any one of said plurality of monitoring means;
said plurality of bypass means each comprising:
shunt means for bypassing the electric charge therethrough when a respective terminal voltage of the respective battery cell group is fully charged, and
switch means, coupled in series with said shunt means, for passing the electric charge bypassed through said shunt means when actuated, to bypass the electric charge around the respective battery cell, said plurality of monitoring means each comprising:
cell-voltage detecting means, coupled to a respective battery cell group, for detecting the respective terminal voltage of the respective battery cell group, and
switch actuating means, coupled to said cell voltage detecting means and to a respective one of said switch means of a corresponding one of said bypass means coupled to the respective battery cell group, for actuating said switch means in accordance with an output of said cell-voltage detecting means indicative that the respective battery cell group is fully charged.

16. The battery charging apparatus of claim 15, wherein said charging means comprises:
current controlling means for controlling current charged into said battery cell groups from said main power supply means in accordance with the terminal voltages detected by said cell-voltage detecting means.

17. The battery charging apparatus of claim 15, wherein said shunt means comprises diodes coupled in series.

18. The battery charging apparatus of claim 17, wherein said shunt means further comprises a resistor coupled in series to said diodes for limiting current passing through said diodes.

19. The battery charging apparatus of claim 15, wherein said control means comprises:
time measuring means, coupled to said switch actuating means of said plurality of monitoring means and said charging means, for measuring when a predetermined time period has elapsed from when one of said switch actuating means actuates a respective switch means and for terminating the supply of the electric charge from said charging means after said predetermined time period has elapsed.

20. The battery charging apparatus of claim 19, wherein each of said switch actuating means are coupled to said control means via respective photodiode/phototransistor pairs.

* * * * *